H. C. EVELYN.
BUMPER ATTACHMENT BRACKET.
APPLICATION FILED APR. 19, 1920.
1,364,261.
Patented Jan. 4, 1921.
2 SHEETS—SHEET 1.
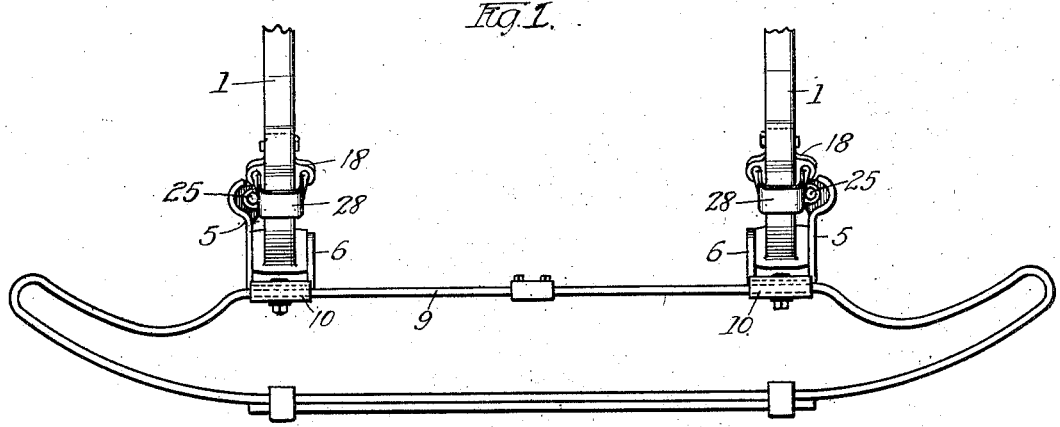
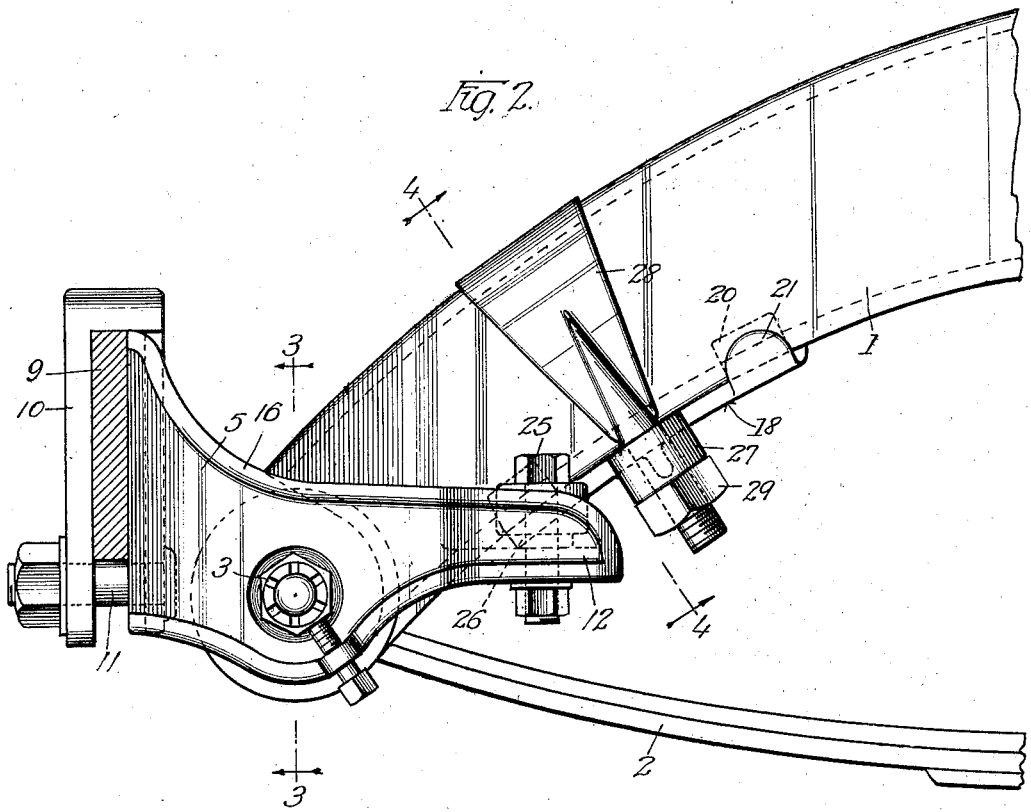
Inventor
Harry C. Evelyn
Attys.

H. C. EVELYN.
BUMPER ATTACHMENT BRACKET.
APPLICATION FILED APR. 19, 1920.
1,364,261.
Patented Jan. 4, 1921.
2 SHEETS—SHEET 2.
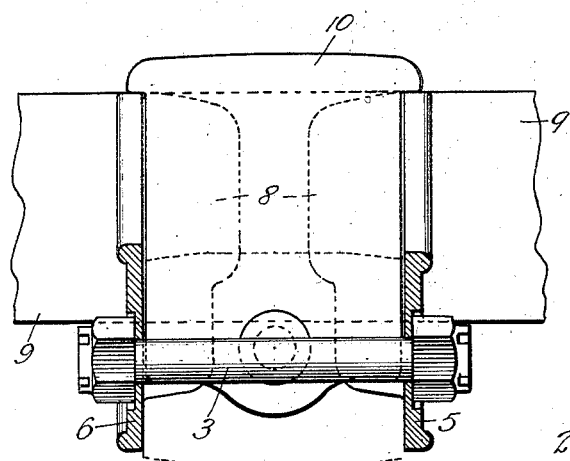
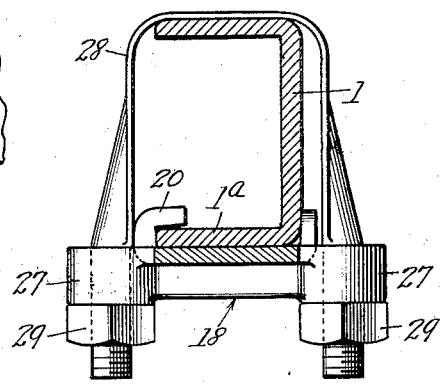
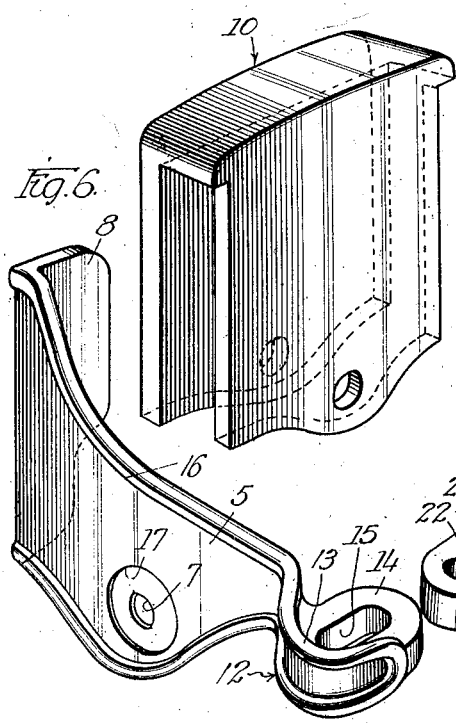
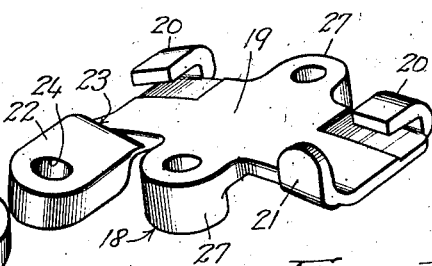
Inventor
Harry C. Evelyn
Attys:

UNITED STATES PATENT OFFICE.

HARRY C. EVELYN, OF CHICAGO, ILLINOIS, ASSIGNOR TO BIFLEX PRODUCTS COMPANY, OF WAUKEGAN, ILLINOIS, A CORPORATION OF ILLINOIS.

BUMPER-ATTACHMENT BRACKET.

1,364,261.     Specification of Letters Patent.     Patented Jan. 4, 1921.

Application filed April 19, 1920. Serial No. 374,919.

*To all whom it may concern:*

Be it known that I, HARRY C. EVELYN, a citizen of the United States, and a resident of Chicago, in the county of Cook and State of Illinois, have invented certain new and useful Improvements in Bumper-Attachment Brackets, of which the following is a specification.

This invention relates to improvements in bumper attachment brackets, and more particularly to brackets for attaching the impact bar of a bumper to the frame members of a motor vehicle chassis.

The object of the present invention is to provide a construction for a bracket of the character described, incorporating certain structural features calculated to materially increase the flexibility and adjustability thereof, thus enabling the application or attachment of a bumper to a greater variety of makes of motor vehicles, each differing in greater or less degree in the formation of those parts of the frame to which the bumper is attached.

A further object of the invention is to provide a bracket that will better withstand the shocks of impact without fracture, and will more effectively eliminate the transmission of the shock to the vehicle chassis.

The features embodying the invention are hereinafter more fully set forth in connection with the accompanying drawings, wherein—

Figure 1 is a top plan view of the front ends of a vehicle frame with bumper attached, Fig. 2 is an enlarged detail view, in side elevation, of a vehicle sill with bracket attached, Fig. 3 is a sectional view taken on line 3, 3 of Fig. 2.

Fig. 4 is a cross-sectional view taken on line 4, 4 of Fig. 2,

Fig. 5 is a perspective view of the bumper connecting clamp,

Fig. 6 is a perspective view of one of the companion side plates, and

Fig. 7 is a perspective view of the secondary plate.

A preferable form of a bracket embodying the features of the invention and constituting one of two similar devices employed in connecting a bumper to a motor vehicle, comprises in general connected bracket members or plates so designed as to conform with the structural lines of the frame members of the vehicle chassis to which the bracket is secured. This portion of the frame is substantially universal in all makes of vehicles and comprises the downwardly curved frame or sill end 1, a spring 2 beneath the sill, said sill and spring being pivotally connected at their ends by means of a pivot bolt 3, the latter being ordinarily provided with an internal lubricating duct and a lubricant receptacle 4 mounted at one end of the pivot bolt.

Referring to the bracket members or plates, the same comprise a pair of companion plates 5 and 6 adapted to be clamped in vertical position and in parallel relation to the opposite sides of the sill 1, by means of the pivot bolt 3 which is inserted through bolt holes 7 formed in the parallel portions of said plates. Portions of the companion plates 5 and 6 project forwardly from their points of connection with the sill 1 and are provided with laterally extending flanges 8, 8 lying in a common plane and projecting inwardly toward each other. The bumper bar 9 extending horizontally in front of and at a short distance from the ends of the sill 1 abuts flatwise against the flanges 8, 8 of the companion plates 5 and 6 and is detachably connected thereto by means of a U-shaped clamping member 10 adapted to be passed over the contacting portion of the bar 9 and the flanges 8, 8, clamping these parts together by means of bolts 11, 11 extending through opposite sides of the clamping member 10 and clearing the inner margins of the flanges 8, 8.

The companion plate 6, ordinarily applied to the inner side of the sill 1, terminates immediately to the rear of the bolt hole 7 thereof, whereas the other companion plate 5, engaging the outer side of the sill 1, is provided with an integral and rearwardly projecting extension 12 formed in substantially the following manner: The companion plate 5 which gradually becomes narrower from the front to the rear end terminates at its rear end in the extension 12, before indicated, this extension consisting of an outwardly curved wall portion 13 substantially semi-circular in form and a transverse or horizontal ear 14 extending from the inner side of the curved wall portion 13. A transverse slot 15 is formed in the ear 14 and constitutes an elongated bolt hole for a purpose hereinafter set forth. The companion plates 5 and 6 are similar in form with the exception of the rearward extension 12, with which the outer plate 5 is alone provided, both plates having a marginal reinforcing bead 16 and a countersunk bore 17 surrounding the bolt holes 7, 7 on their outer faces.

Adapted to be attached to the sill 1 at a point rearwardly of its forward end, and adjustably connected to one of the companion plates, namely, the outer plate 5 having the rearward extension 12, is another plate 18 which may be termed a secondary or reinforcing plate. This plate is designed to engage the under side of the sill 1 and to extend longitudinally thereof and in counter-distinction to the companion plates 5 and 6 occupies a horizontal position rather than a vertical position. This secondary plate is formed substantially as follows: A body member 19 of suitable length and of a width substantially equal to the width of the sill member, is formed with a slight longitudinal curvature conforming with the contour of the under side of the sill with which it has flatwise contact. Along the inner margin of the plate 18 are provided integral hooks or clips 20 extending upwardly and then inwardly over the body member, these clips being preferably located at the forward and rearward ends of the said body member, and are adapted to hook over the edges of the lower web 1$^a$ of the sill, which in the ordinary construction comprises a channel bar positioned so that the parallel webs extend inwardly. On the outer margin of the body member 19 are provided integral lugs 21 and 22, positioned directly opposite from the clips 20, the rearmost lug 21 being a simple vertical projection, whereas the forward lug 22 is of considerably greater size and projects some distance beyond the body member and constitutes a member whereby the said body member is connected to the extension 12 of the forward companion plate 5. The lug 22, as before suggested, projects outwardly and laterally from the forward end of the body member 19 and is provided at its inner end with a shoulder 23 adapted to bear against the outer surface of the sill 1, and is further provided with a vertical bolt hole 24. When the plates are properly positioned upon the sill 1, the lug 22 lies immediately above the ear 14 of the plate 5 with the elongated bolt hole 15 of the latter immediately below the bolt hole 24 of the lug 22. A bolt 25 extends through these bolt holes, there being preferably mounted on the bolt between the ear 14 and the lug 22 of the plates 5 and 18, a suitable number of washers 26, these washers being removed or added as the adjustment of the bracket members demand.

In addition to the clips 20 and lugs 21 and 22 heretofore described, the secondary plate 18 is provided with two oppositely disposed lugs 27, 27 formed integral with the body member 19 and located midway between the front and rear ends thereof. These lugs are provided with vertical holes which are adapted to receive the ends of a metal strap member 28 which extends around the sill 1. The ends of the strap terminate in threaded extremities upon which are mounted nuts 29, 29, bearing against the under side of the lugs 27, 27, these nuts being capable of being tightened, thereby drawing the strap tightly around the sill and similarly the plate 18 firmly against the under surface of the sill 1.

In applying the bracket to the frame of a motor vehicle, the companion plates would ordinarily be applied first by removing the pivot bolt 3 and replacing the same with the companion plates applied to either side of the sill 1. The secondary plate 18 would then be attached to the sill at a point rearwardly of its forward end, the strap 28 having been previously removed. This would be accomplished by inserting the margins of the lower web 1$^a$ into the clips 20, 20 and drawing the body member upwardly in contact with the under surface of the web so that the lugs 21 and 22 engage the outer face of the sill. By adjusting the position of the plate 18 along the sill the bolt hole 24 of the lug 22 is brought over the elongated bolt hole 15 of the plate 5 and the bolt 25 inserted therethrough. Subsequently the strap 28 would be applied in the obvious manner.

Although the method of application of the several members may vary somewhat, it is apparent that in any event the said members would not be securely connected until the necessary adjustments were made, inasmuch as it is manifest that when first applying the bracket certain vertical and lateral adjustments are necessary in order that the same will properly fit the particular vehicle frame. Vertical adjustment is permitted by applying the desired number of washers upon the bolt 25 so that when the same is tightened the necessary distance will separate the parts of the plates 5 and 18 connected thereby. This arrangement provides for the necessary relative vertical adjustment of the bracket members. Similarly, the elongated bolt hole with which the plate 5 is provided permits certain relative lateral adjustment between the bracket members, this adjustment being determined before the bolt 25 is finally tightened. The strap 28 is preferably formed of material having sufficient flexibility to permit the same to shape itself according to the portion of the sill which it embraces so that when the nuts 29, 29 are tightened the said strap will hug the surface of the sill closely and will not give an unsightly appearance, nor will it interfere with other parts of the vehicle which may be attached to the sill near the strap.

For example, in many vehicles a metal sheet extends between the frame sills immediately in front of the radiator which constitutes a so-called "splash-pan," and again, the fenders are ordinarily bolted along the adjacent part of the sill. By the use of this strap, which is of reduced thickness and hugs the sill closely, it can be easily applied without cutting away the metal of the fenders or splash pan, but only necessitating the temporary removal of certain bolts to permit the strap to be placed beneath the portions of the fenders or splash pan which overlap and are connected to the sill.

By reason of the construction hereinbefore described, a bracket is provided which permits ample degree of adjustability so that it may be easily applied to a large number of motor vehicles thereby making the bumper with which it is used substantially universal in its application. Furthermore, the use of two plates capable of being attached at different parts of the sill, and those plates adjustably connected together, provides a strong and rigid support for the bumper. By the provision of the particular connecting means for the secondary plate, the same can be easily applied to the vehicle sill without displacing or necessitating the removal of any other portions of the vehicle attached to the sill.

It is apparent that the device embodying the features of the invention may be variously modified without departing from the spirit of the invention and therefore I do not wish to be limited except in so far as the invention is specifically pointed out in the appended claims.

I claim as my invention:

1. A bumper bracket comprising a plate adapted to be fixed to the end of the vehicle frame sill, and a secondary plate adapted to be clamped flatwise against the surface of said sill rearwardly of said first mentioned plate, and having laterally adjustable connection with said plate.

2. A bumper bracket comprising a plate adapted to be clamped to the side of a vehicle frame sill, and to be connected at its forward end to a bumper bar, a secondary plate adapted to be clamped against the sill rearwardly of said first mentioned plate, the same being provided with a transverse slot at its rear end, and a connecting member engaging said slot and said secondary plate.

3. A bumper bracket comprising a plate adapted to be fixed to the end of a vehicle frame sill, and to be connected at one end to a bumper bar, and a secondary plate connected at the opposite end of said first mentioned plate and extending longitudinally of the sill, and a strap surrounding said sill and connected at its end to said secondary plate.

4. A bumper bracket, comprising a plate adapted to be clamped to the side of a vehicle sill and connected to one end to a bumper, a secondary plate adapted for flatwise contact along said sill and provided with marginal clips engaging an edge of said sill, and a strap surrounding said sill and connected at its ends to said secondary plate, and means connecting said plates permitting relative vertical and lateral adjustment.

5. In a bumper attaching bracket, the combination with a vehicle sill having a spring connected at the end thereof, of a plate secured against said sill by means of the spring bolt, a secondary plate engaging the under surface of said sill rearwardly of said first mentioned plate, a strap extending around said sill and connected at its ends to said last mentioned plate, and a bolt extending through adjacent portions of said plates.

6. A bumper bracket comprising a plate adapted to be clamped to the side of a vehicle sill and provided with a rearward extension terminating in an ear, a secondary plate adapted to be clamped to said sill and provided with marginal lugs engaging the edges of said sill, and a strap surrounding said sill, and a bolt extending through said secondary plate and said ear.

7. In a bumper bracket, the combination with a vehicle sill, of companion plates adapted to be clamped on opposite sides of the sill, and a secondary plate adapted to be clamped flatwise along said sill rearwardly of said companion plates and provided with clamping members engaging said sill, and means for adjustably connecting said last mentioned plate with one of said companion plates.

8. In a bumper attaching bracket, the combination with a vehicle sill having a spring connected at the end thereof, of companion plates clamped on opposite sides of said sill by means of the spring bolt, one of said plates having a rearwardly extending transverse ear, a secondary plate having clamping engagement with the under surface of said sill rearwardly of said companion plates and provided with a strap extending around said sill, and a bolt extending vertically through said last mentioned plate and the ear of one of said companion plates.

In witness whereof, I hereunto subscribe my name this 15th day of March, A. D., 1920.

HARRY C. EVELYN.